(12) United States Patent
Knoop et al.

(10) Patent No.: US 7,840,354 B2
(45) Date of Patent: Nov. 23, 2010

(54) METHOD AND DEVICE FOR AUTOMATICALLY TRIGGERING A VEHICLE DECELERATION

(75) Inventors: Michael Knoop, Ludwigsburg (DE); Goetz Braeuchle, Reichartshausen (DE); Hermann Winner, Bietigheim (DE); Michael Weilkes, Sachsenheim (DE); Martin Heinebrodt, Stuttgart (DE); Werner Uhler, Bruchsal (DE); Joachim Thiele, Tamm (DE); Martin Staempfle, Ulm (DE); Fred Oechsle, Ludwigsburg (DE); Ulf Wilhelm, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/380,089

(22) PCT Filed: Jul. 11, 2002

(86) PCT No.: PCT/DE02/02547

§ 371 (c)(1),
(2), (4) Date: Aug. 8, 2003

(87) PCT Pub. No.: WO03/007271

PCT Pub. Date: Jan. 23, 2003

(65) Prior Publication Data

US 2004/0030497 A1 Feb. 12, 2004

(30) Foreign Application Priority Data

Jul. 11, 2001 (DE) ................. 101 33 027

(51) Int. Cl.
*B60K 31/00* (2006.01)
*G06F 19/00* (2006.01)

(52) U.S. Cl. .................... 701/301; 701/36; 701/48; 180/282; 180/275; 303/154

(58) Field of Classification Search .......... 701/70–73, 701/93, 301, 38, 36, 37, 48, 41; 180/167, 180/169, 282, 275; 340/902, 903; 303/113.1, 303/146, 150, 154, 139; 188/181
See application file for complete search history.

(56) References Cited

U.S. PATENT DOCUMENTS 5,251,680 A * 10/1993 Minezawa et al. .......... 180/169

(Continued)

FOREIGN PATENT DOCUMENTS

DE 33 25 714 1/1985

(Continued)

OTHER PUBLICATIONS

Winner, Witte et al., Adaptive Cruise Control System—Aspects and Development Trends, SAE paper 96 10 10, SAE International Congress and Exposition, Detroit, Michigan, Feb. 26-29, 1996.

*Primary Examiner*—Ronnie Mancho
(74) *Attorney, Agent, or Firm*—Kenyon & Kenyon LLP

(57) ABSTRACT

A method and a device for automatic triggering of deceleration of a vehicle for preventing a collision, which is accomplished by the fact that a variable, which represents a probability of collision with another vehicle, must exceed a predefinable threshold value, and the threshold value is variable as a function of the driver's response, the current driving situation, or the ambient situation. To determine the change in the threshold value, signals from a steering angle sensor, a brake pedal sensor, an accelerator pedal sensor, a device for determining the speed of the vehicle, a device for determining the uphill or downhill slope of the road, a device for determining the vehicle yaw rate, a device for determining the vehicle float angle or a device for detecting stationary and moving objects in the vicinity of the vehicle, in particular in the area in front of the vehicle, are analyzed.

8 Claims, 2 Drawing Sheets

U.S. PATENT DOCUMENTS

| | | |
|---|---|---|
| 5,420,792 A | 5/1995 | Butsuen et al. |
| 5,479,173 A * | 12/1995 | Yoshioka et al. ............... 342/70 |
| 5,642,093 A | 6/1997 | Arai |
| 5,684,699 A | 11/1997 | Sugiyama |
| 5,924,508 A * | 7/1999 | Clauss et al. ................ 180/179 |
| 5,925,082 A | 7/1999 | Tokunaga |
| 6,415,230 B1 * | 7/2002 | Maruko et al. ............... 701/301 |
| 6,445,308 B1 * | 9/2002 | Koike ......................... 340/902 |
| 6,567,748 B2 * | 5/2003 | Matsuno ...................... 701/301 |
| 6,571,176 B1 * | 5/2003 | Shinmura et al. ........... 701/301 |

FOREIGN PATENT DOCUMENTS

| | | |
|---|---|---|
| DE | 40 39 005 | 6/1991 |
| DE | 43 25 940 | 12/1994 |
| DE | 44 13 172 | 3/1995 |
| DE | 195 47 111 | 6/1997 |
| DE | 196 29 229 | 1/1998 |
| DE | 197 04 854 | 8/1998 |
| DE | 199 39 817 | 3/2001 |
| EP | 0 927 677 | 7/1999 |
| EP | 1 412 930 | 4/2004 |
| FR | 2 787 081 | 6/2000 |
| JP | 5-238368 | 9/1993 |
| JP | 5-278581 | 10/1993 |
| JP | 4110265 | 4/1994 |
| JP | 7-117524 | 5/1995 |
| JP | 7-125565 | 5/1995 |
| JP | 8-192655 | 7/1996 |
| JP | 9-249047 | 9/1997 |
| JP | 10119673 | 5/1998 |
| JP | 10157487 | 6/1998 |
| JP | 11-227582 | 8/1999 |
| JP | 11-240434 | 9/1999 |
| JP | 11-262105 | 9/1999 |
| JP | 2000-118263 | 4/2000 |
| JP | 2000-219115 | 8/2000 |
| JP | 2000-242888 | 9/2000 |
| JP | 2001 47984 | 2/2001 |
| JP | 2001-88576 | 4/2001 |
| WO | WO 99/58359 | 11/1999 |
| WO | WO 03/007271 | 1/2003 |

* cited by examiner

METHOD AND DEVICE FOR AUTOMATICALLY TRIGGERING A VEHICLE DECELERATION

RELATED APPLICATION INFORMATION

The present application is a U.S. national phase application of PCT/DE02/02547, which was filed on Jul. 11, 2002, and claims priority to and the benefit of German patent application no. 10133027.8, which was filed in Germany on Jul. 11, 2001, the disclosures of all of which are incorporated herein by reference.

FIELD OF THE INVENTION

A method and a device for automatic triggering of deceleration of a vehicle to prevent a collision or to reduce the consequences of an imminent collision.

BACKGROUND INFORMATION

In the past, there have been systems for providing distance regulation and speed control that expand the functionality of a traditional cruise control to the extent that speed control is switched to distance control when a slower moving vehicle is detected in front of one's own vehicle, and then the vehicle in front is followed at the same speed. The basic functioning of such a distance and speed control system is discussed in the article "Adaptive Cruise Control System—Aspects and Development Trends" by Winner, Witte et al., SAE paper 96 10 10, which was published at the SAE International Congress and Exposition, Detroit, Feb. 26-29, 1996.

German Patent 195 47 111 discusses a method and a device for controlling the brake system of a vehicle in which pressure is introduced into the wheel brakes by the control unit even before the start of traction control whenever predetermined conditions prevail, while no mentionable braking action is applied to the driving wheels.

SUMMARY OF THE INVENTION

The present invention is directed to providing an exemplary method and an exemplary device for automatic triggering of deceleration of a vehicle to prevent a collision or to reduce the consequences of an imminent collision by the fact that one or more variables representing a risk of collision with another object must lie within a predefinable triggering range.

Automatic triggering of deceleration of a vehicle to prevent a collision or to reduce the consequences of an imminent collision refers in this context, in particular, to automatic triggering of emergency braking, that is, full braking, where the braking deceleration corresponds approximately to the maximum possible vehicle deceleration. Automatically triggered emergency braking, that is, full braking is especially risky for the passengers of the vehicle and for the other traffic participants because this full braking in most cases constitutes a potential hazard. For this reason, the requirements for the triggering algorithm for such a deceleration are especially strict because the algorithm determines the reliability of this safety function. To alter the triggering range so that it best corresponds to the particular prevailing situation of the vehicle and its surroundings, the range is varied as a function of the input variables described here.

If the risk of collision is evaluated only on the basis of one value, then the triggering range may be defined by exceeding a threshold value.

The threshold value of automatic triggering of vehicle deceleration is advantageously increased when the steering wheel angular velocity exceeds a first steering wheel angular velocity threshold value so that triggering is activated only at a higher risk of a collision. Assuming that the driver has already responded to the potentially dangerous situation by taking an evasive maneuver when the first steering wheel angular velocity threshold value was exceeded, the triggering threshold may be raised because the driver has already responded himself.

The automatic triggering of vehicle deceleration is advantageously suppressed when the steering wheel angular velocity exceeds a second steering wheel angular velocity threshold which is greater than the first steering wheel angular velocity threshold value. If the driver turns the vehicle steering so rapidly by a manual evasion maneuver that the second steering wheel angular velocity threshold value is exceeded, then it may be assumed that the vehicle will begin to skid with any additional deceleration implemented.

In addition it is believed to be advantageous that the automatically triggered deceleration is terminated when the steering wheel angular velocity due to the driver's response already exceeds a third steering wheel angular velocity threshold value during a vehicle deceleration that has already been triggered automatically. If the automatic vehicle deceleration has already begun to decelerate the vehicle, but the driver would like to make an evasive maneuver through a steering action, then the driver's response is given priority with respect to the automatic action, so the deceleration is terminated and the driver is allowed to execute his evasive maneuver.

Automatic triggering of deceleration is prevented to advantage when the brake pressure due to actuation of the brake pedal by the driver corresponds approximately to the maximum possible brake pressure. If the driver himself executes a deceleration during an automatic deceleration and the driver's deceleration corresponds approximately to the same braking pressure of an automatically triggered deceleration, then the driver's response is given dominance with respect to the automatic action because it may be assumed that the driver is paying attention and has a grasp of the situation.

It is furthermore advantageous that the automatically triggered deceleration is terminated when the driver operates the brake pedal and automatic deceleration of the vehicle is triggered during operation of the brake pedal by the driver, and the driver subsequently releases the brake pedal. In the event the driver executes a partial deceleration and, following that, would like to execute an evasive maneuver, it should be ensured that the automatic vehicle deceleration does not interfere with the steering maneuver. Execution of a steering maneuver and a simultaneous automatic deceleration could cause the vehicle to skid.

It is also especially advantageous that the triggering threshold for automatic triggering of a vehicle deceleration is raised when the driver operates the accelerator pedal so rapidly that a first accelerator pedal rate threshold value is exceeded. By exceeding this first predetermined accelerator pedal rate threshold value, it may be concluded that the driver would like to get out of this potentially hazardous situation by accelerating, so that a simultaneous automatic deceleration should begin only at a higher risk potential because it may be assumed that the driver is paying attention and has a grasp of the situation.

In addition, it is believed to be advantageous that automatic triggering of a vehicle deceleration is prevented when the driver operates the accelerator pedal so rapidly that a second accelerator pedal rate threshold value is exceeded, this second threshold value in general being greater than the first. In the case when the driver requires such a strong acceleration to get out of the hazardous situation, consequently a deceleration should be ruled out entirely.

A deceleration that has already been triggered automatically is advantageously terminated again if, during an automatically triggered vehicle deceleration, the driver operates the accelerator pedal so rapidly that a third accelerator pedal rate threshold value is exceeded. If the driver decides during and automatic deceleration that it would be better in this case to accelerate the vehicle, this driver decision is given priority and consequently deceleration is terminated.

The threshold value for automatic triggering of a vehicle deceleration is advantageously lowered when the driver releases the accelerator pedal so rapidly that the absolute value of a fourth accelerator pedal rate threshold value is exceeded. If the driver recognizes the potential hazard in a situation and consequently lets up on the accelerator pedal quickly but does not step on the brake pedal, then an automatic deceleration is initiated at an even earlier point in time because it may be assumed that the driver has the wish to decelerate but has not yet implemented it rapidly enough.

In addition, it is believed to be advantageous that the threshold value for automatic triggering of a vehicle deceleration is lowered when the driver operates the brake pedal in such a way that a vehicle deceleration occurs which does not correspond to the maximum possible deceleration and there is a change in steering angle, the steering wheel angular velocity of which does not exceed a predetermined steering wheel angular velocity threshold value. In this case, it may be assumed that this is an incomplete response on the part of the driver in which case automatic full braking would yield a gain in safety.

Activation of an automatically triggered vehicle deceleration may be advantageously done only when the vehicle speed exceeds a predetermined speed threshold value. This ensures that automatic deceleration will not occur at low speeds, because in this case automatic vehicle deceleration would not be effective.

In addition, it is believed to be advantageous that the threshold value for automatic triggering of vehicle deceleration is lowered when it is recognized that the vehicle is moving downhill on a slope whose gradient exceeds a predetermined downhill gradient threshold value. In general, the braking distance and the evasive maneuver radii are increased when the vehicle is driving downhill. To compensate for this effect, the threshold value is lowered, thus permitting earlier triggering of automatic vehicle deceleration.

In addition, it is believed to be advantageous that the threshold value for automatic triggering of a vehicle deceleration is raised when it is recognized that the vehicle is moving on an uphill slope, whose gradient exceeds a predetermined slope threshold value. In this case, the braking distances and the evasive maneuver radii are reduced. To prevent faulty triggering due to a triggering threshold value that is too low, the threshold value for triggering the automatic vehicle deceleration is raised.

Automatic triggering of vehicle deceleration is advantageously prevented if at least one braking intervention or engine intervention for stabilizing the driving performance of the vehicle is performed while there is a yaw rate whose absolute value is greater than a predetermined yaw rate threshold value. In the case of the at least one braking intervention or engine intervention to stabilize the driving performance, it may be assumed that the vehicle has already become unstable in its movement and tends to swerve. If the yaw rate is high at the same time, the vehicle could begin to skid as a result of an additional deceleration, which is why automatic triggering of vehicle deceleration must be suppressed.

In addition, it is believed to be advantageous that triggering of an automatically triggered vehicle deceleration is prevented when it is recognized that there is a vehicle float angle which is greater than a predetermined float angle threshold value. When there is a float angle greater than the predetermined float angle threshold value, the vehicle is not moving in parallel with the longitudinal axis of the vehicle, so the obstacles detected are not in the direction of movement of the vehicle. To prevent an unjustified faulty triggering, in this case the automatically triggered vehicle deceleration is suppressed.

In addition, it is believed to be advantageous that triggering of automatic vehicle deceleration is prevented when it is recognized that the change in the vehicle float angle is greater than a predetermined float angle gradient threshold value. This float angle gradient is calculated to advantage from the yaw rate, minus the transverse acceleration divided by the longitudinal speed. If this criterion is met, it may be concluded that the vehicle is already skidding, so that an automatically triggered vehicle deceleration is not advisable in this case.

In addition, it is believed to be advantageous that the device for detecting stationary and moving objects in the vicinity of the vehicle as a function of which the threshold value for triggering an automatic vehicle deceleration may be varied is composed of at least one radar system, at least one lidar system or at least one video system.

Objects moving across the direction of travel of the vehicle or moving opposite the direction of movement of one's own vehicle or detected as stationary objects from the beginning of their detection by the ambient detection system are not used to determine the probability of a collision. An object moving across the direction of travel is generally able to escape the dangerous region very rapidly, which is why triggering of the vehicle deceleration would be superfluous in this case. A vehicle moving in the direction opposite the direction of movement of one's own vehicle is also advantageously not used for determining the probability of a collision, because otherwise a vehicle coming from the opposite direction and approaching one's own vehicle could unjustifiably trigger emergency braking. In addition, objects recognized as stationary from the beginning of their detection are usually guide rails, traffic signs or other objects in the peripheral area of the road. These objects are advantageously not taken into account in determining the probability of collision.

Objects that have been recognized as stationary and over which or under which objects moving in front of one's own vehicle in the same direction travel are advantageously not included in the analysis to determine the variable representing the probability of a collision. Such an object might be, for example, a beverage container on the road surface or a bridge which is suspended at a low level above the road surface. These are objects over which or under which passing vehicles have already traveled and which are thus irrelevant for automatic emergency braking.

It may also be advantageous to terminate the automatically triggered vehicle deceleration when it is recognized after automatic triggering of vehicle deceleration that the triggering criteria are no longer met. In this manner, vehicle deceleration, which has been triggered without proper justification, may be terminated, so that subsequent damages due to the unjustified triggering may also be prevented. This is accomplished through a continuous determination of the risk of collision even during automatic vehicle deceleration and continuous comparison with the prevailing threshold value for triggering of this function.

The implementation of the exemplary method according to the present invention in the form of a control element which is provided for a control unit of an adaptive distance control and/or cruise control of a motor vehicle is especially important. A program which is capable of running on a computer, in particular a microprocessor, and is suitable for executing the exemplary method according to the present invention is stored in the control element. In this case, the invention is implemented by a program stored in the control element, so that this control element provided with the program also constitutes the present invention in the same way as does the exemplary method for whose execution the program is suitable. An electric storage medium, e.g., a read-only memory in particular, may be used as the control element.

Thus, the present invention concerns an exemplary method and an exemplary device for automatic triggering of deceleration of a vehicle to prevent a collision or to reduce the consequences of an imminent collision; this is accomplished by one or more variables which represent the risk of collision with another object and must be within a predefinable triggering range, this triggering range being variable as a function of the driver's response, the prevailing driving situation or the ambient situation. To determine the change in the triggering range, the signals analyzed include those from a steering angle sensor, a brake pedal sensor, an accelerator pedal sensor, a device for determining vehicle speed, a device for determining the slope of the road surface, that is, the gradient of the road surface, a device for determining the yaw rate of the vehicle, a device for determining the float angle of the vehicle or a device for detecting stationary and moving objects in the surroundings of the vehicle, in particular in the area in front of the vehicle.

DETAILED DESCRIPTION

Figure 1:
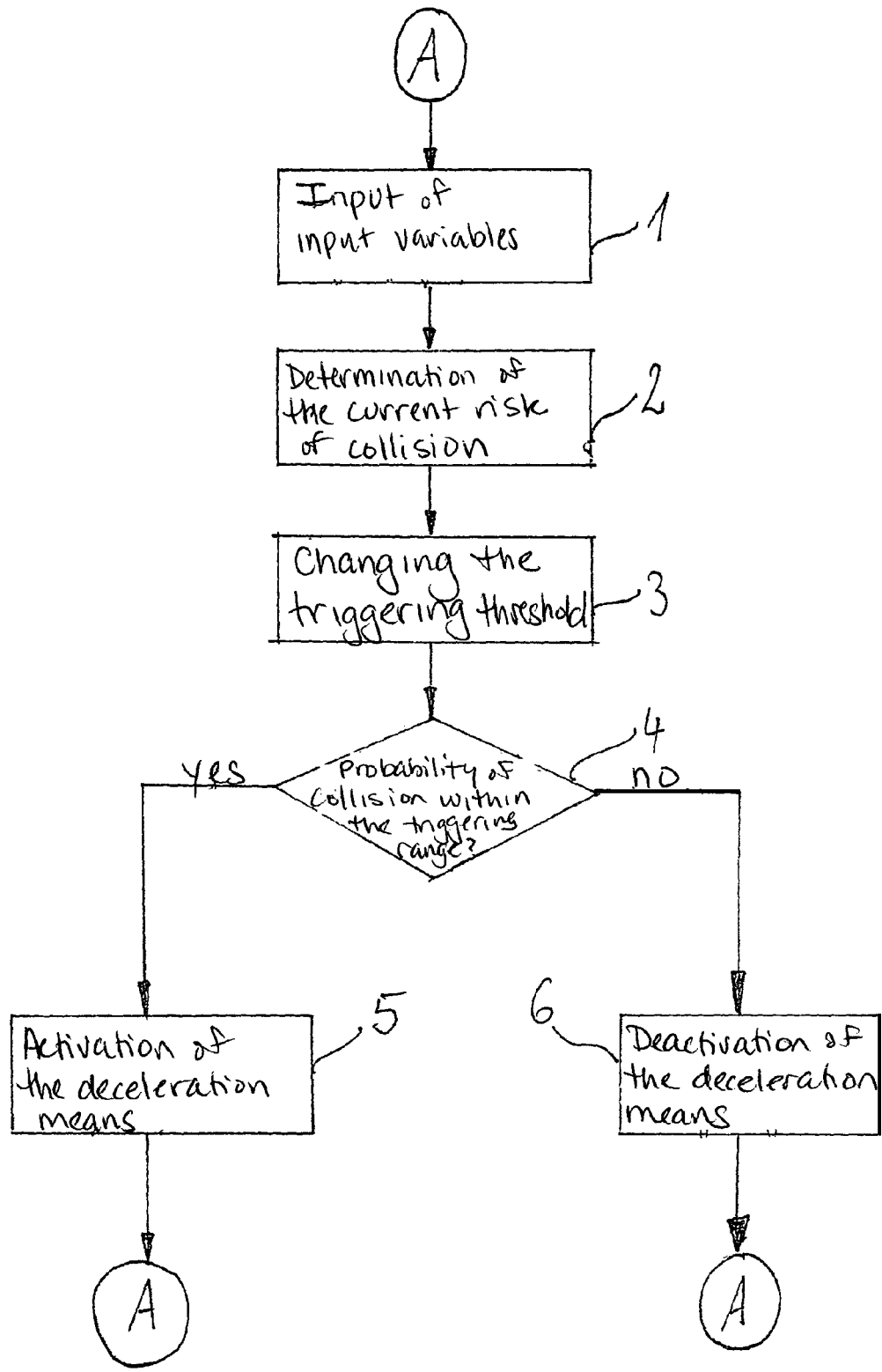
FIG. 1 shows a flow chart for execution of the exemplary method according to the present invention.

FIG. 1 shows a flow chart for execution of the exemplary method according to the present invention. At the beginning of the cycle indicated here, which is carried out continuously, the input variables are entered as shown in block 1. Input variables here include signals coming from a steering angle sensor, a brake pedal sensor, an accelerator pedal sensor, a device for determining the vehicle speed, a device for determining the road surface slope or gradient, a device for determining the yaw rate of the vehicle or a device for determining the float angle of the vehicle or a device for detecting stationary and moving objects in the surroundings of the vehicle. On the basis of this data entered in step 1, the current risk of a collision is determined in subsequent step 2.

This current risk of collision represents the probability that one's own vehicle will collide with a stationary or moving object which is in the direction of movement of one's own vehicle. This current collision risk, which is determined in step 2, is stored as a variable which represents this probability and may be composed of multiple values. In step 3, a triggering range, which has a fixedly stored predetermined range in the normal case, is modified as a function of the input variables thus determined. This change in the triggering range takes place in the manner of the claimed subject matter. Accordingly, the triggering range is increased or reduced so that triggering takes place at an increased or reduced risk of collision with respect to the unaltered triggering range.

Accordingly, the triggering range may be reduced, increased or kept the same. In cases in which triggering is to be prevented, this triggering range is increased in so that it is greater in any case than the theoretically greatest possible probability of collision. As a result, the prevention of triggering may be represented by a variable threshold value. Subsequently, a comparison is performed in block 4, determining whether the values determined in block 2, representing the probability of collision, are within the current triggering range determined in block 3. If this condition is met in block 4, then the flow chart branches off further to block 5, because in these cases full braking is to be initiated. Accordingly in block 5, the deceleration arrangement of the vehicle is activated by braking the vehicle at maximum possible vehicle deceleration. After this activation in block 5, the flow chart reaches point A and then jumps back to the beginning, whereupon the cycle is run through again.

In the event the query in block 4 reveals that the variable representing the probability of collision is less than or equal to the current triggering threshold determined in block 3, the flow chart branches off to step 6. In block 6, the deceleration arrangement is deactivated by depressurizing the brake system of the vehicle or by leaving it depressurized in the case of a prior deactivation. In this case, the vehicle continues to move in a state which is to be defined as normal without performing emergency braking or full braking. A vehicle deceleration performed by the driver in regular driving operation remains unaffected by this deactivation, which is illustrated in step 6. Subsequently, the flow chart again reaches point A, whereupon the sequence jumps back to the beginning and the cycle is repeated.

Figure 2:
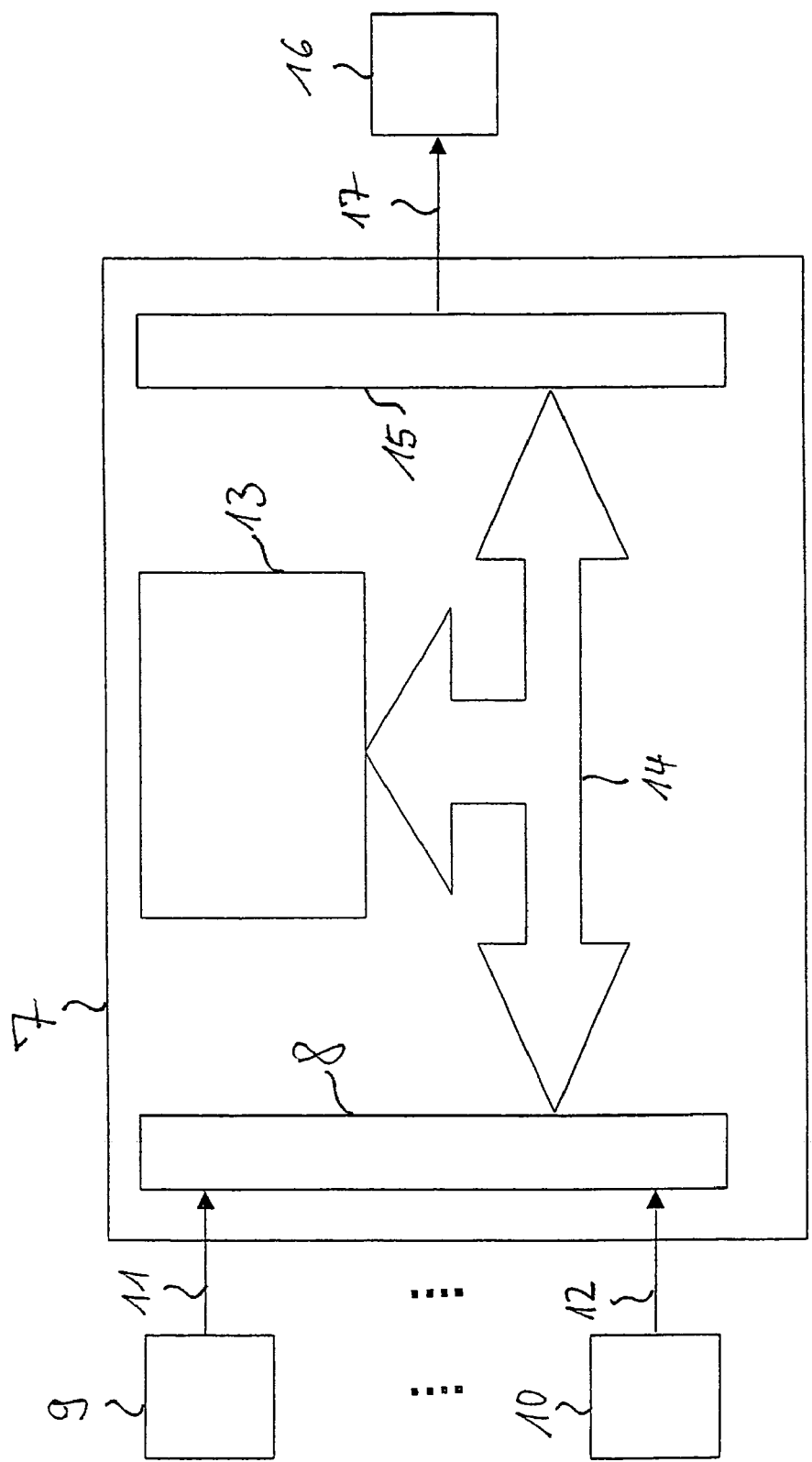
FIG. 2 shows a block diagram of an exemplary device for execution of the exemplary method according to the present invention.

FIG. 2 shows a block diagram of an exemplary device suitable for performing the exemplary method described according to FIG. 1. It shows a device 7, implemented to advantage as an electronic control unit having an input field 8, among other things. Signals 11 through 12, representing the input variables, are sent to this input field 8. These input variables come from devices 9 through 10. These devices 9 through 10, which provide input signals for device 7, may include a steering angle sensor, a brake pedal sensor, an accelerator pedal sensor, a device for determining the vehicle speed, a device for determining the road surface inclination or gradient, a device for determining the vehicle yaw rate, a device for determining the vehicle float angle, or a device for detecting stationary and moving objects in the vicinity of the vehicle, in particular in the form of a radar system, a lidar system or a video system.

Signals 11 through 12 provided by these devices 9 through 10 are sent to device 7 via input variable field 8. In addition, input variables 11 through 12 are sent from the input variable field to an analyzer device 13 via a data exchange system 14. This analyzer device 13 is a microprocessor which performs the exemplary method according to the present invention to advantage. This microprocessor 13 provides an output variable 17, which may cause activation and/or deactivation of the decelerating arrangement of the vehicle. This output variable is sent by microprocessor 13 to an output field 15 via a data exchange system 14. This output field 15 controls a device 16 which is able to directly influence the deceleration arrangement of the vehicle.

In addition, the microprocessor 13 may provide a plurality of output signals 17 which are output from output field 15 to the control device for controlling deceleration arrangement 16. Output signal 17, which is output from output field 15, may prepare the deceleration arrangement for imminent emergency braking or full braking in the event of an increase in the potential hazard but when the triggering threshold has not yet been reached. This may be accomplished by prefilling the brake system and applying the brake shoes to the brake disc. This may achieve a much more rapid deceleration effect at the time of triggering.

What is claimed is:

1. A method of automatically triggering a deceleration of a vehicle for one of preventing a collision and reducing consequences of an imminent collision, the method comprising:
   providing at least one variable representing collision risk between the vehicle and another object, the another object being within a predetermined triggering range;
   varying the predetermined triggering range as a function of a driver response by signals from at least one of a steering angle sensor, a brake pedal sensor, and an accelerator pedal sensor; and
   lowering a first threshold value for automatically triggering the deceleration when a driver operates a brake pedal if both (a) the driver's operation of the brake pedal is less than a braking pressure of the automatically triggered deceleration, and (b) there is a manual change in a steering angle in which a steering wheel angular velocity does not exceed an absolute value of a predetermined steering wheel angular velocity.

2. The method of claim 1, further comprising:
   raising a threshold value of the predetermined triggering range for automatically triggering the deceleration when a steering wheel angular velocity exceeds a first steering wheel angular velocity threshold value, so that the triggering is activated only when there is a higher collision risk.

3. The method of claim 1, wherein an automatically triggered deceleration is suppressed when a steering wheel angular velocity exceeds a second steering wheel angular velocity threshold value that is greater than a first steering wheel angular velocity threshold value.

4. The method of claim 1, wherein an automatically triggered deceleration is terminated when a steering wheel angular velocity during the automatically triggered deceleration exceeds a third steering wheel angular velocity threshold value.

5. The method of claim 1, further comprising:
   preventing an automatically triggered deceleration when a brake pressure corresponds approximately to a maximum possible brake pressure due to a driver operating a brake pedal.

6. The method of claim 1, further comprising:
   raising a threshold value of the predetermined triggering range when a steering wheel angular velocity exceeds a first steering wheel angular velocity threshold value, so that the triggering is activated only when a collision risk value is higher than the threshold for the triggering prior to the raising of the threshold value;
   wherein an automatically triggered deceleration is suppressed when a steering wheel angular velocity exceeds a second steering wheel angular velocity threshold value that is greater than the first steering wheel angular velocity threshold value.

7. The method of claim 6, further comprising:
   preventing an automatically triggered deceleration when a brake pressure corresponds approximately to a maximum possible brake pressure due to a driver operating a brake pedal.

8. The method of claim 7, wherein an automatically triggered deceleration is terminated when a steering wheel angular velocity during the automatically triggered deceleration exceeds a third steering wheel angular velocity threshold value.

* * * * *